US010510206B2

(12) United States Patent
Shimizu et al.

(10) Patent No.: US 10,510,206 B2
(45) Date of Patent: Dec. 17, 2019

(54) GAMING SYSTEM AND METHOD FOR PROVIDING A GAMING MACHINE WITH DUAL PROJECTION DISPLAYS

(71) Applicant: ARUZE GAMING (HONG KONG) LIMITED, Hong Kong (HK)

(72) Inventors: Akira Shimizu, Tokyo (JP); Akira Osawa, Tokyo (JP)

(73) Assignee: Aruze Gaming (Hong Kong) Limited, Hong Kong (HK)

( * ) Notice: Subject to any disclaimer, the term of this patent is extended or adjusted under 35 U.S.C. 154(b) by 0 days.

(21) Appl. No.: 16/141,037

(22) Filed: Sep. 25, 2018

(65) Prior Publication Data

US 2019/0096166 A1 Mar. 28, 2019

Related U.S. Application Data

(60) Provisional application No. 62/562,885, filed on Sep. 25, 2017.

(51) Int. Cl.

*A63F 9/24* (2006.01)
*A63F 13/00* (2014.01)
*G06F 17/00* (2019.01)
*G06F 19/00* (2018.01)
*G07F 17/32* (2006.01)
*G07F 17/34* (2006.01)

(52) U.S. Cl.

CPC .......... *G07F 17/3213* (2013.01); *G07F 17/34* (2013.01)

(58) Field of Classification Search

USPC .............................. 463/1, 20, 22, 25, 39, 42
See application file for complete search history.

(56) References Cited

U.S. PATENT DOCUMENTS

| | | | | |
|---|---|---|---|---|
| 2002/0039229 A1* | 4/2002 | Hirose | G03B 21/56 | 359/451 |
| 2003/0147112 A1* | 8/2003 | Mukawa | G02B 5/32 | 359/15 |
| 2004/0196272 A1* | 10/2004 | Yamashita | G09G 3/3688 | 345/204 |

* cited by examiner

*Primary Examiner* — Adetokunbo O Torimiro
(74) *Attorney, Agent, or Firm* — EIP US LLP

(57) ABSTRACT

In one aspect, improved gaming machines are disclosed herein, which provides a first projection display for each gaming machine, and a second projector for displaying video on a plurality of the gaming machines.

20 Claims, 6 Drawing Sheets

GAMING SYSTEM AND METHOD FOR PROVIDING A GAMING MACHINE WITH DUAL PROJECTION DISPLAYS

CROSS-REFERENCE TO RELATED APPLICATIONS

This application claims the benefit of U.S. Provisional Application No. 62/562,885, filed Sep. 25, 2017, under 35 U.S.C. § 119(a), the entire contents of which are incorporated by reference in its entirety.

BACKGROUND OF THE INVENTION

Field of the Invention

The present disclosure relates to gaming systems, such as gaming machines and slot machines.

Description of the Related Technology

Gaming machines, such as slot machines, video poker machines, and other mechanical, electromechanical, and electronic machines used to determine and/or display wagering game outcomes have become an integral part of the worldwide gambling industry. Often, the commercial success of such gaming machines is heavily reliant on their methods of determining the gaming outcomes, and their methods of displaying the gaming outcomes. Additionally, as casino floors provide a multitude of varying gaming machines, it can become very important to provide a visibly distinguishing feature to a gaming machine to attract initial interest.

SUMMARY

In one embodiment, a gaming system is disclosed, comprising a plurality of gaming machines, wherein each gaming machine comprises a primary game screen having a first curvature, a secondary screen having a second, different curvature, the secondary screen being located above the primary game screen, and a primary projection display positioned to project a first video at least partially away from the primary game screen, wherein the projected first video reflects off of at least one reflector onto the primary game screen. The gaming system further comprises a secondary projection display positioned to simultaneously project a second video image onto each of the secondary screens of the plurality of gaming machines.

In another embodiment, a gaming system is disclosed, wherein the secondary projection display is in communication with a community graphics processing unit, which is further in communication with each of a plurality of game graphics processing units from a plurality of gaming machines. In such an embodiment, this configuration allows for the display from the secondary projection display to be coordinated with the plurality of primary projection displays from each of the gaming machines.

It is therefore an advantage of some of the embodiments of the present disclosure to provide a gaming system that provides individual projection displays for each of a plurality of gaming machines, and a secondary projection display configured to project across secondary screens of the plurality of gaming machines.

It is another advantage of some of the embodiments of the present disclosure to provide a gaming system wherein the primary projection display is securely located within the gaming machine, and the secondary projection display is located outside of the gaming machine.

It is still another advantage of some of the embodiments of the present disclosure to provide a gaming system wherein one or both of the primary projection display and the secondary projection display are positioned to have their projected images be reflected onto their associated screens.

It is another advantage of some of the embodiments of the present disclosure to provide a gaming system wherein the primary projection display is configured to display game-sensitive information and/or the secondary projection display is configured to display unregulated content.

It should be understood that various changes and modifications to the embodiments described herein will be apparent to those skilled in the art. Such changes and modifications can be made without departing from the spirit and scope of the present subject matter and without diminishing its intended advantages.

DETAILED DESCRIPTION OF CERTAIN INVENTIVE EMBODIMENTS

Figure 1:
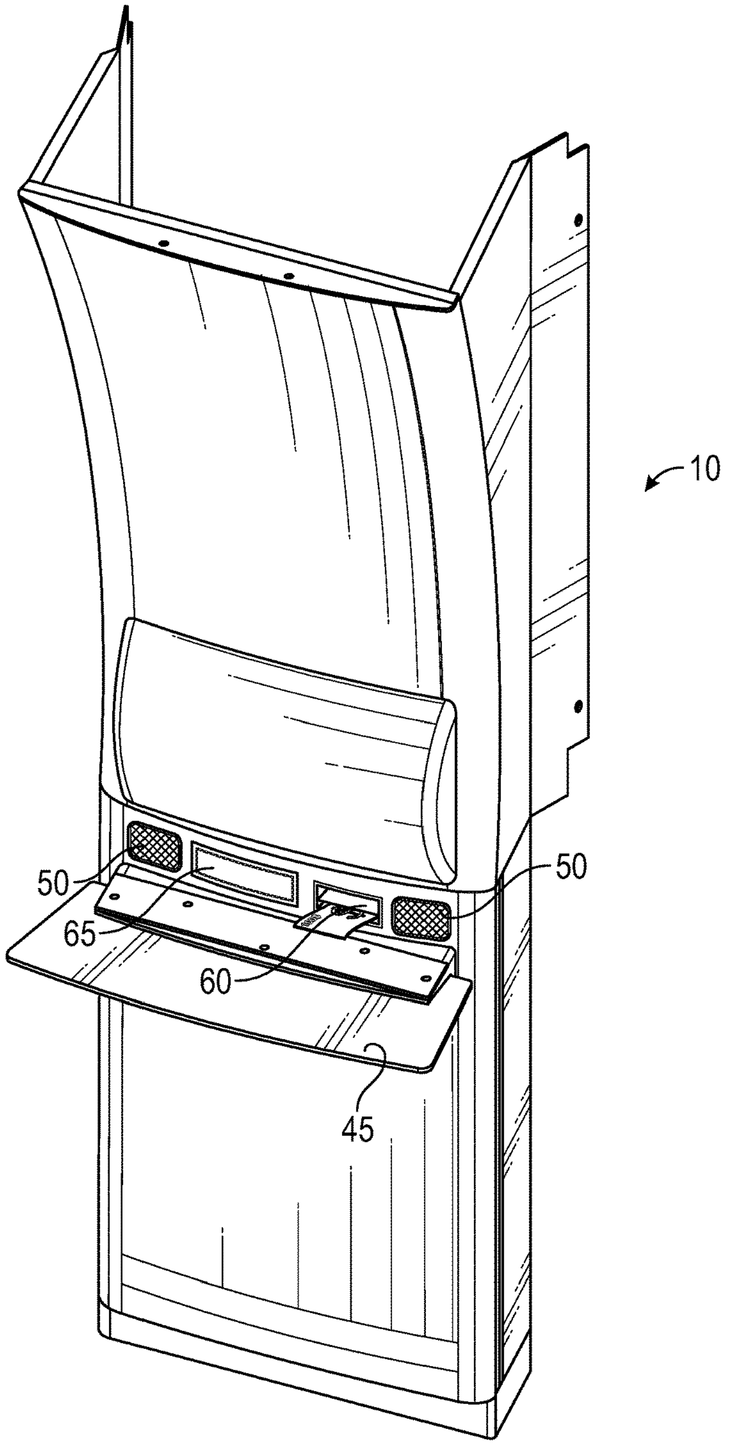
FIG. 1 is a perspective view of a gaming machine, in accordance with an embodiment of the present disclosure.

Referring to FIG. 1, a gaming machine, shown generally at 10, is illustrated in accordance with one embodiment of the present disclosure. Gaming machines are sometimes referred to as gaming systems, slot machines, electronic gaming machines (EGM's), poker machines, pokies, video lottery terminals (VLT's), gaming terminals, video slot machines, and video gaming machines, and all such machines typically operate in a similar manner in that a player places something of value at risk on an outcome that is unknown and uncertain to the player, and the machine displays the associated outcome, thereby informing the player of the resolution associated with their placing said something at risk.

In the present example, gaming machine 10 may include one or more speakers 50 to provide audio effects for the associated game or to communicate commands or game events to a player of the game. It is contemplated that speakers 50 can work independently of each other, work in coordination with each other, work in coordination with other speakers, for example speakers located in a player seat associated with gaming machine 10, work as part of a surround sound system, or any combination thereof.

Gaming machine 10 may also include an input device 45, such as buttons or a touchscreen. In the presently displayed example, input device 45 is illustrated as a separate panel, and comprises a touchscreen and underlying display components. In another embodiment, input device 45 comprises a panel of physical buttons. In a further embodiment, input device 45 comprises only a touchscreen component that is positioned over or adjacent to a game display component or components. Input device 45 could be utilized by a player to select components of their game, such as the amount of their wager or how to allocate their wager within the game, and allow them to initiate the play of the game, for example by selecting a "Spin" button or other play initiating button. It is contemplated that input device 45 can include physical buttons or virtual buttons, such as a touchscreen input, or a combination thereof. In one embodiment, input device 45 includes physical buttons with associated video displays, such as an LCD, which in turn allows the gaming machine 10 to be converted to a different title or style of game without having to replace input device 45.

Continuing with FIG. 1, gaming machine 10 further includes player tracking device 65. In one embodiment, player tracking device 65 includes an information display. It is contemplated that such an information display could be utilized to communicate with the player. It is contemplated that such an information display could be a liquid crystal display (LCD), a plasma display, an electroluminescent (EL) display, an organic light emitting diode (OLED) display, an LED dot matrix type of display, or could be any other type of display suitable for smaller displays. It is contemplated that gaming machine 10 could include a visibly distinct player tracking device 65, or a visually integrated player tracking device that utilizes a portion of a primary gaming display and possibly also an associated touchscreen in order to interact with a player. In practice, a player makes their identity known to the player tracking device 65, either actively by inserting a player tracking card and/or entering a personal identification number (PIN) into player tracking device 65, or passively by utilizing a location device, such as a radio frequency identification (RFID) tag or a Bluetooth device which can transmit information short distances, for example a bracelet, smart watch, smart phone, or other similar devices. Thereafter, the player tracking device 65 communicates over a network with a casino tracking system to track a player's play, and potentially offer awards or other services to the player, often through the same player tracking device 65. The player tracking device 65 can also display player status information back to the player, or other information based on or otherwise related to a player's play history and/or status, including awards earned by a player. It is also contemplated that the networked player tracking device 65 can be utilized to offer other services to players, such as the ordering of drinks, or making promotional offers to a player, perhaps working in coordination with printer/bill acceptor 60 to do so.

The example illustrated in FIG. 1 also includes printer/bill acceptor 60. In this example, the component is configured to accept tangible mediums of currency, such a physical/paper bills and tickets. In another embodiment, printer/bill acceptor 60 may be comprised of multiple components, such as a separate currency acceptor and printer. In such an embodiment, the currency acceptor may be a coin acceptor which accepts coins. In still another embodiment, gaming machine 10 includes more than one currency acceptor, such as one for coins, one for paper bills, and/or one for tickets. In another embodiment, printer/bill acceptor 60 can accept multiple denominations of currency, or even currencies from multiple countries. In still another embodiment, printer/bill acceptor 60 can accept a ticket or similar physical indicium that is distributed by a casino or another gaming machine, which indicates an amount of currency available for use on gaming machine 10. In a further embodiment, printer/bill acceptor 60 can accept credit cards, debit cards, prepaid cards, or other instruments to initiate an electronic funds transfer. It is also contemplated that instead of a printer/bill acceptor 60, the gaming machine 10 provides another means to allow a player to access money in order to wager on a play of the game. For example, the player may enter a PIN in order to access an account they have, either with a bank or the casino itself, and upon entering the PIN and other information, certain amount of funds are transferred to the gaming machine 10 or otherwise allowed to be wagered via gaming machine 10. In another embodiment, printer/bill acceptor 60 is configured to interact with a radio frequency identification (RFID) or a Bluetooth device which can transmit financial information short distances, for example a bracelet, smart watch, smart phone, or other similar devices.

Printer/bill acceptor 60 is further configured to print out tickets which represent values of money that may be cashed in. It is common now that gaming machines accept currency, but will only provide a ticket upon cashout, and then the holder of the ticket must take the ticket to the cashier's cage or a ticket redemption kiosk in order to obtain the currency indicated by the ticket. For gaming machine 10, it is contemplated that after a player elects to cashout by selecting an appropriate input at input device 45, printer/bill acceptor 60 prints out a ticket which indicates the amount of currency the player elected to cashout, and the player can then take the ticket and insert it into another gaming machine, or visit a cashier's cage or a ticket redemption kiosk to exchange the ticket for currency.

Figure 2:
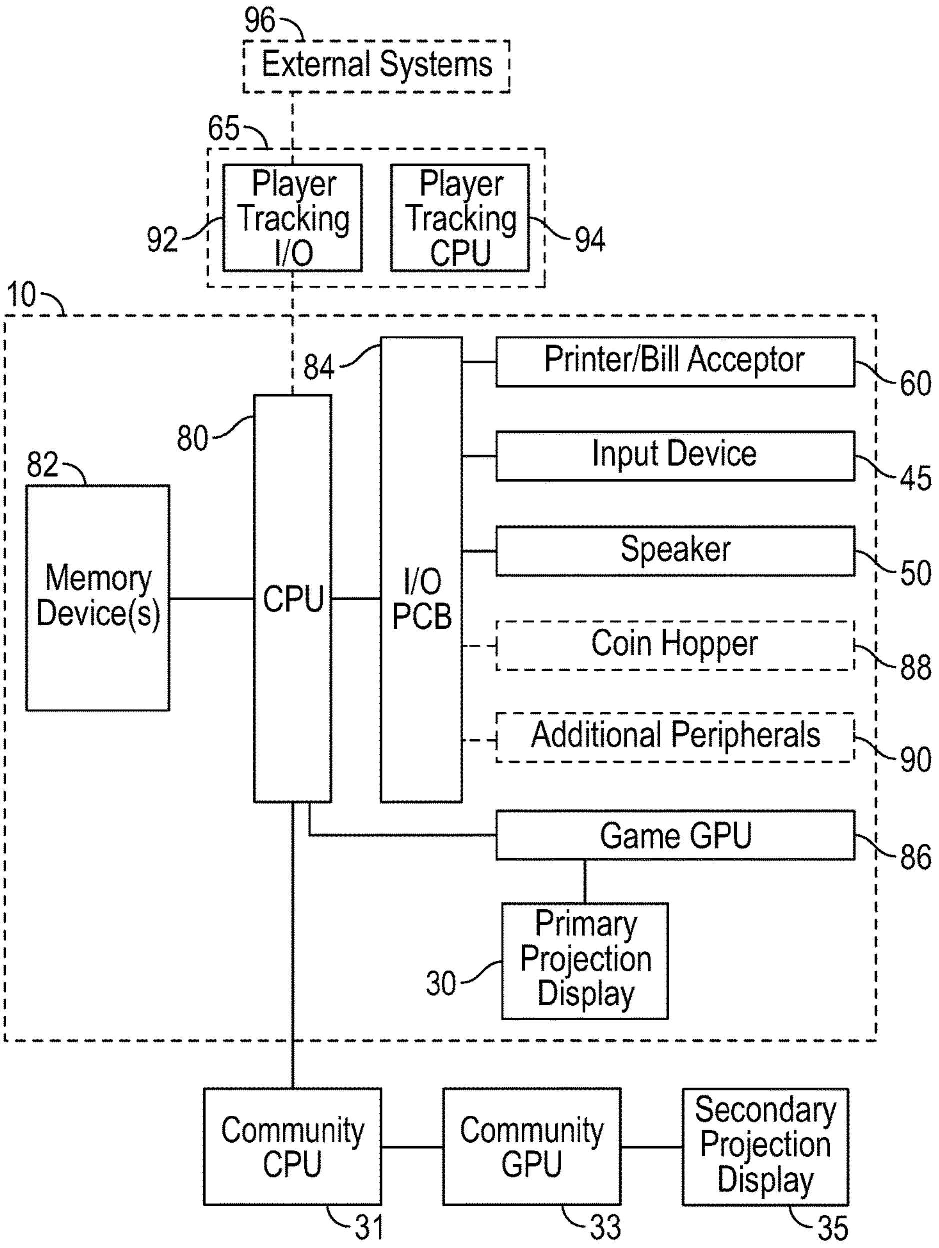
FIG. 2 is a schematic view of a gaming system, in accordance with an embodiment of the present disclosure.

FIG. 2 is a schematic diagram of a gaming system in accordance with one embodiment of the present disclosure. In this embodiment, gaming machine 10 utilizes a central processing unit (CPU) 80, such as a processor, a microprocessor, or the like. CPU 80 can perform arithmetic and logical operations, and also extract instructions from memory device(s) 82 and decodes and executes them. Alternatively, it is contemplated that instead of CPU 80, an array processor or vector processor having multiple parallel computing elements, which utilizes a distributed computing model, may be used to perform such arithmetic and logical operations.

Memory device(s) 82 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In one embodiment, the memory device(s) 82 includes read only memory (ROM), which may, for example, store regulatory-sensitive instructions for gaming machine 10. In one embodiment, the memory device(s) 82 includes flash memory and/or EEPROM (electrically erasable programmable read only memory). Any other suitable magnetic, optical and/or semiconductor memory may operate in conjunction with the gaming device 10 disclosed herein.

In some embodiments, memory device(s) 82 store program code that is executable by CPU 80. Memory device(s) 82 may also store operating data, such as a random number generator (RNG), game instructions, event data, display files, game history data, and other such data and instructions that allow for a gaming device to properly function in a regulated environment.

In the present example, CPU 80 is communicatively connected to at least one input/output device (I/O device) 84 which operates as an electrical interface between CPU 80 and various peripherals of the gaming machine 10. The I/O device 84 can be or can include a printed circuit board (PCB)

and/or one or more integrated circuits. FIG. 2 further illustrates various peripherals, including printer/bill acceptor 60, input device 45, speakers 50, as well as possible peripherals coin hopper 88, and other additional peripherals 90.

Also illustrated in this example is a game graphic processing unit (GPU) 86, which works in coordination with CPU 80 to control the primary projection display. In the illustrated embodiment, CPU 80 also communicates with a community CPU 31. In the present embodiment, community CPU 31 controls the display of the secondary projection display 35, and communicates with community GPU 33 which controls a secondary projection display 35. In the present example, game GPU 86 is securely located within gaming machine 10, such as within a gaming cabinet, and controls the display of game-sensitive information on the primary projection display 30. Continuing with this example, CPU 80 communicates with an externally positioned community CPU 31. In such an embodiment, it is contemplated that community CPU 31, community GPU 33 and secondary projection display 35 may not form part of a regulated gaming machine 10, and therefore may not be subject to strict security protocols and regulations. In such an example, it is contemplated that CPU 80, by communicating with game GPU 86 and community CPU 31, may communicate so they can coordinate various displays, but community CPU 31 does not receive game-sensitive information that might affect that apparent outcome for a player.

In such an example, community CPU 31, community GPU 33, and secondary projection display 35 may be utilized to provide third party advertising, casino advertising, casino information, or other such non-game-event driven displays that an operator might desire, without the possible requirement of having such displays and/or content approved, authorized, and/or licensed as part of the gaming machine 10. However, by configuring gaming machine 10 to communicate with community CPU 31, it is contemplated that displays on the primary projection display 30 and the secondary projection display may be coordinated for such things as attract modes, celebration graphics, game branding, or other non-outcome-sensitive displays.

In another embodiment, community CPU 31 and/or community GPU 33 is/are located within gaming device 10, and may therefore form part of the system of providing game-sensitive displays. In another embodiment, community CPU 31 communicates with a plurality of gaming machines and their respective game CPUs 80. In still another embodiment, community CPU 31 is located within gaming device 10 and communicates with a plurality of gaming machines and their respective game CPU's. In a further embodiment, game GPU 86 communicates with a non-projection display, such as an LCD or OLED display. In another embodiment, game GPU 86 communicates directly with a secondary projection display 35. In another embodiment, secondary projection display 35 is also securely located as part of gaming device 10.

In one example of the present embodiment, by allowing game CPU 80 to communicate with community CPU 31, it is possible to instruct secondary projection display 35 to coordinate its projection to visually resemble that which the primary projection display 30. In such an example, it is possible to provide images that appear to be provided by a single display device. It is contemplated that such coordination could provide benefits in providing graphics for award celebrations, attract screens, and even game-driven events. For example, while the primary projection display 30 is displaying a game event, secondary projection display 35 could be displaying similar graphics which appear to just be an extension of the primary game screen to a player. Another example could be that primary projection display 30 displays a big win, and then secondary projection display 35 displays a coin waterfall starting at the top of a secondary screen and when it reaches the primary screen, the primary projection display 30 displays a continuation of the coin waterfall. Other such coordinated displays or contemplated herein.

In another embodiment, game GPU 86 communicates with as standard video display, such as an LED, LCD, OLED, or similar flat-panel display. In one example, such a standard video display replaces the primary projection display 30 and is utilized to display the primary game functions. In another example, such a standard video display is in addition to the primary projection display 30.

Also communicatively connected to CPU 80 is a player tracking device 65. It is contemplated that the player tracking device 65 includes a distinct player tracking input/output (I/O) 92 and player tracking CPU 94, as well as associated player tracking memory (not shown). In one embodiment, it is contemplated that player tracking device 65 could have a direct line of communication with printer/bill acceptor 60. In such an embodiment, the player tracking device 65 could then cause ticket printer 60 to print out promotional tickets without having to first communicate with gaming machine CPU 80, which may be desirable from a regulatory view. FIG. 2 also illustrates that gaming machine 10 is communicatively connected to external systems 96, which could include one or more of an accounting system, player tracking system, player bonusing system, player assistance system, server-based gaming system or other game content management system, wide area network (WAN), local area network (LAN), the internet, or other communication systems.

Games offered on gaming machines such as gaming machine 10 can be widely varied and diverse. However, all such games typically must meet very stringent requirements, which assure their fairness and perhaps even their appearance of fairness. Generally speaking, games must return to players, in the form of monetary awards, on average, somewhere between 75% and 100% of all wagers accepted, which is referred to as payback percentage. Specific payback requirements are specific to each of the hundreds of regulated gaming jurisdictions worldwide, but as a general manner, fall within such a range, and must be statistically verifiable over numerous plays. Many such jurisdictions have additional requirements related to how a game outcome is determined, whether the outcome is completely random, primarily random, unpredictable by a player, or to what effects a player's skill level can have on an outcome. It is the requirement to meet such stringent regulations that truly limit the features that can be designed into a game for gaming machine 10.

Some of the more popular game styles involve distinct reels of symbols which spin, and then stop after which the symbols which are viewable are evaluated, often in relation to one or more paylines, to determine if an arrangement of the viewable symbols meets predefined relationship criteria which define wins, which has associated awards. Variations of this example includes changes to the layout, number, type, and location of reels, the associated symbols, and paylines, how the predefined relationship criteria are applied, and additional functionality applied to certain symbols, such as wild symbols, multiplier symbols, expanding symbols, stacked symbols, multi-symbols, scatter symbols, and combinations thereof.

Figure 3:
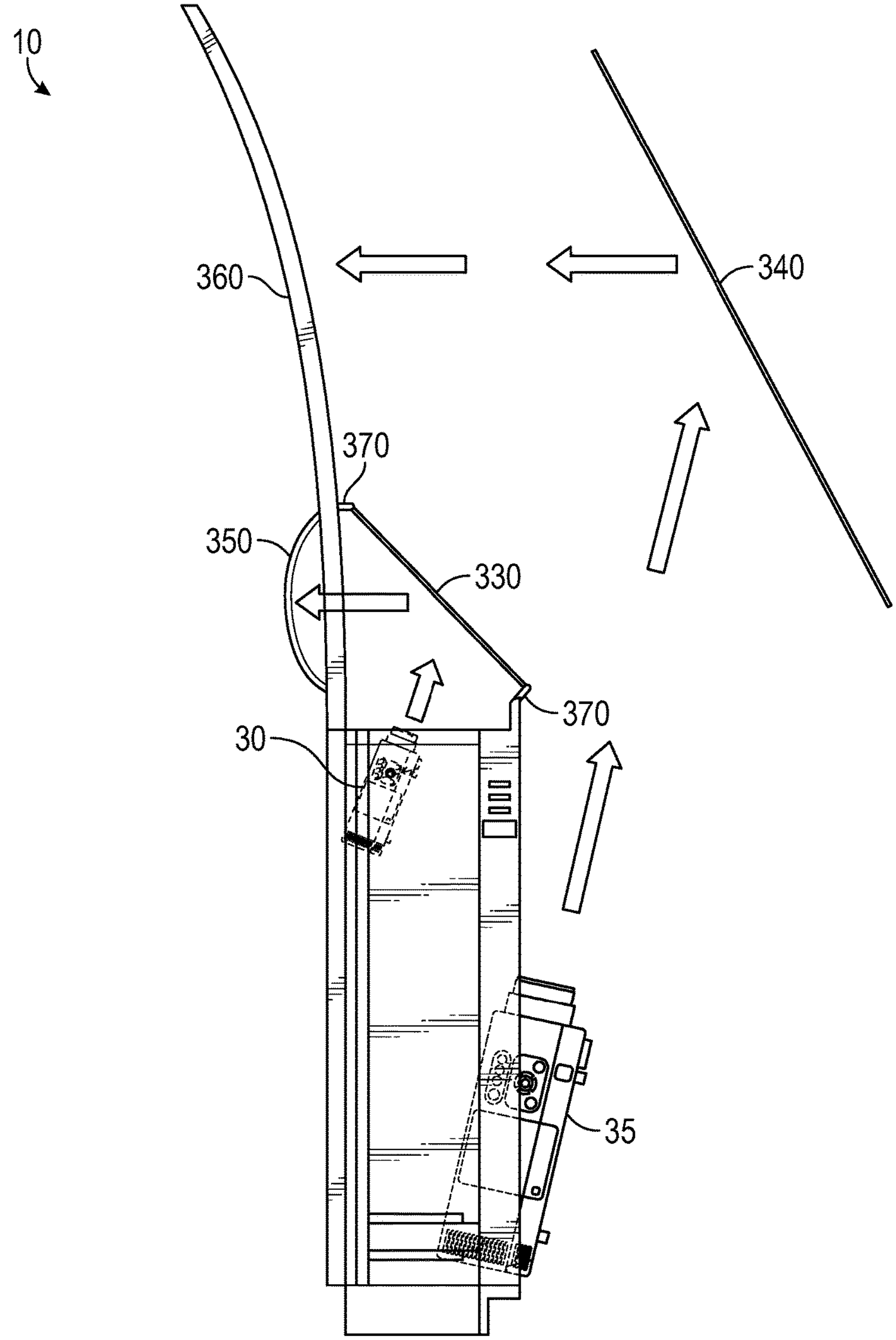
FIG. 3 is a side view of a gaming machine, in accordance with an embodiment of the present disclosure.

FIG. 3 is a side view of one example of the present disclosure. In this example, a primary projection display 30 is illustrated in an orientation to project up and away from the front of a gaming machine 10. Primary projection display 30 is also illustrated in an orientation to project away from primary game screen 350. In this embodiment, primary projection display 30 is positioned to project towards the rear towards a primary game reflector 330, which is oriented to reflect the projected image to the primary game screen 350, as illustrated by the arrows. It is contemplated that the illustrated arrangement of such components in this embodiment provides several benefits, including allowing for a slimmer gaming machine 10 as the primary projection display 30 does not need to be positioned far enough to the rear to allow for a full-width projection on primary game screen 350.

Continuing with FIG. 3, a secondary projection display 35 is illustrated in a similar orientation as the primary projection display 30—upward and towards the rear, away from both the front of gaming machine 10 and secondary screen 360. In a similar fashion to the primary game display, this example illustrates the secondary projection display 35 projecting upwards towards a secondary reflector 340 which reflects the projected display towards the secondary screen 360.

Primary projection display 30 and secondary projection display 35 may be any commercially available digital projector, including but not limited to, a liquid crystal display (LCD) projector, a digital light processing (DLP) projector with single chip or three-chip, a liquid crystal on silicon (LCoS) projector, a multi-LCD laser light source projector, or any other digital projector offering good resolution.

In one embodiment, primary game reflector 330 and/or secondary reflector 340 is a mirror. In another embodiment, primary game reflector 330 and/or secondary reflector 340 is comprised of a plurality of mirrors. In a further embodiment, primary game reflector 330 and/or secondary reflector 340 is a polished piece of metal, or comprised of a plurality of polished pieces of metal. In the present embodiment, primary game reflector 330 is attached to gaming machine 10 by reflector connectors 370. In another embodiment, primary game reflector 330 and/or secondary reflector 340 is fixedly positioned relative gaming machine 10. In a further embodiment, primary game reflector 330 and/or secondary reflector 340 is configured to move slightly to improve the quality of the projected images. In another embodiment, primary game reflector 330 and/or secondary reflector 340 is configured to move only for maintenance.

It is contemplated that the presently illustrated embodiment, of providing multiple projectors which are oriented to project towards reflectors, allows for a more compact footprint on a casino floor. It is expected that casino operators are desirous of maximizing their casino floor space, as this allows for more gaming machines and therefore more players.

FIG. 3 further illustrates elements of the display screen, and specifically primary screen 350 and secondary screen 360. In the present embodiment, both the primary screen 350 and secondary screen 360 have associated curvatures, as discussed in more detail below.

Figure 4:
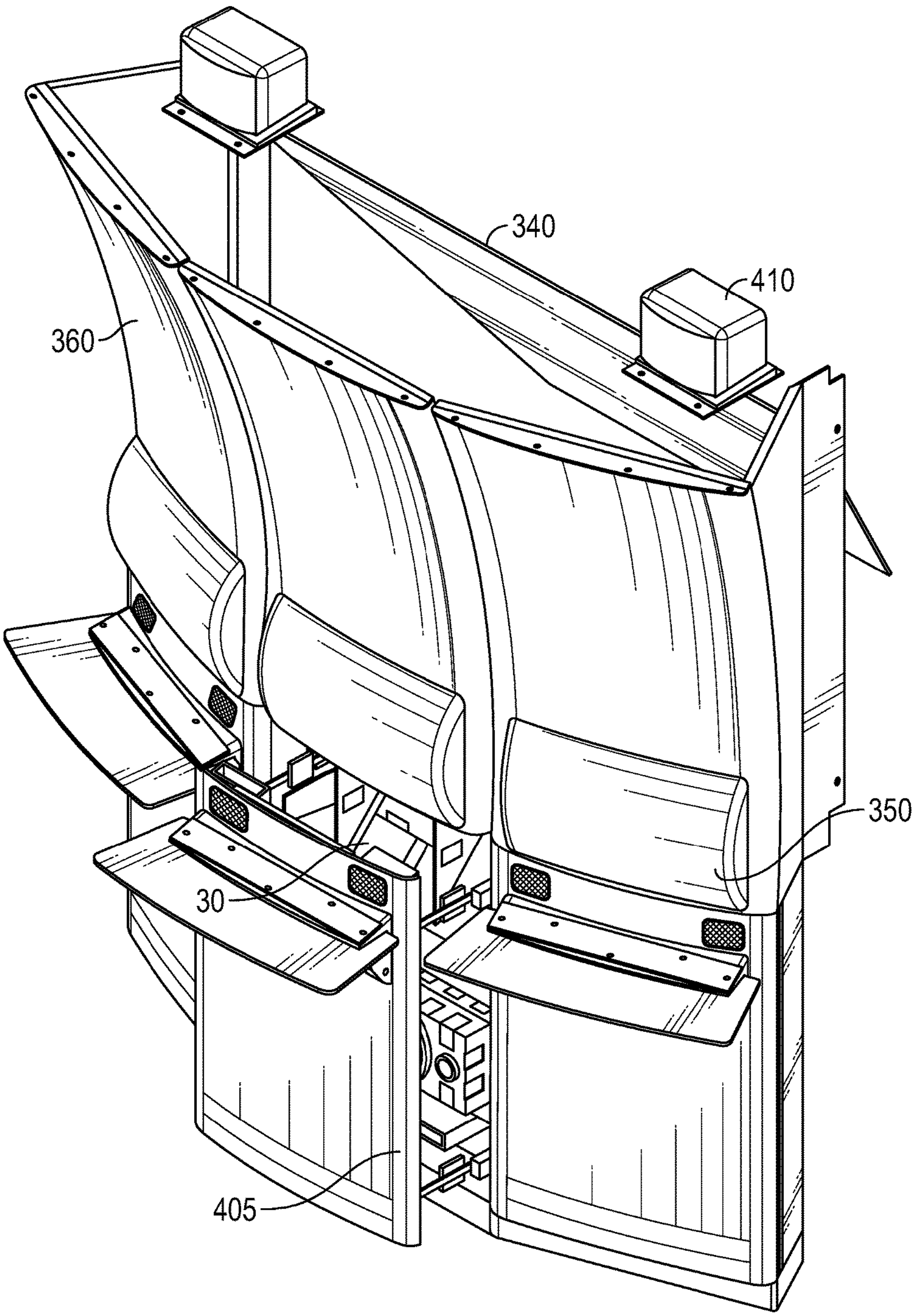
FIG. 4 is a perspective view of a gaming system, from the front, in accordance with an embodiment of the present disclosure.
Figure 5:
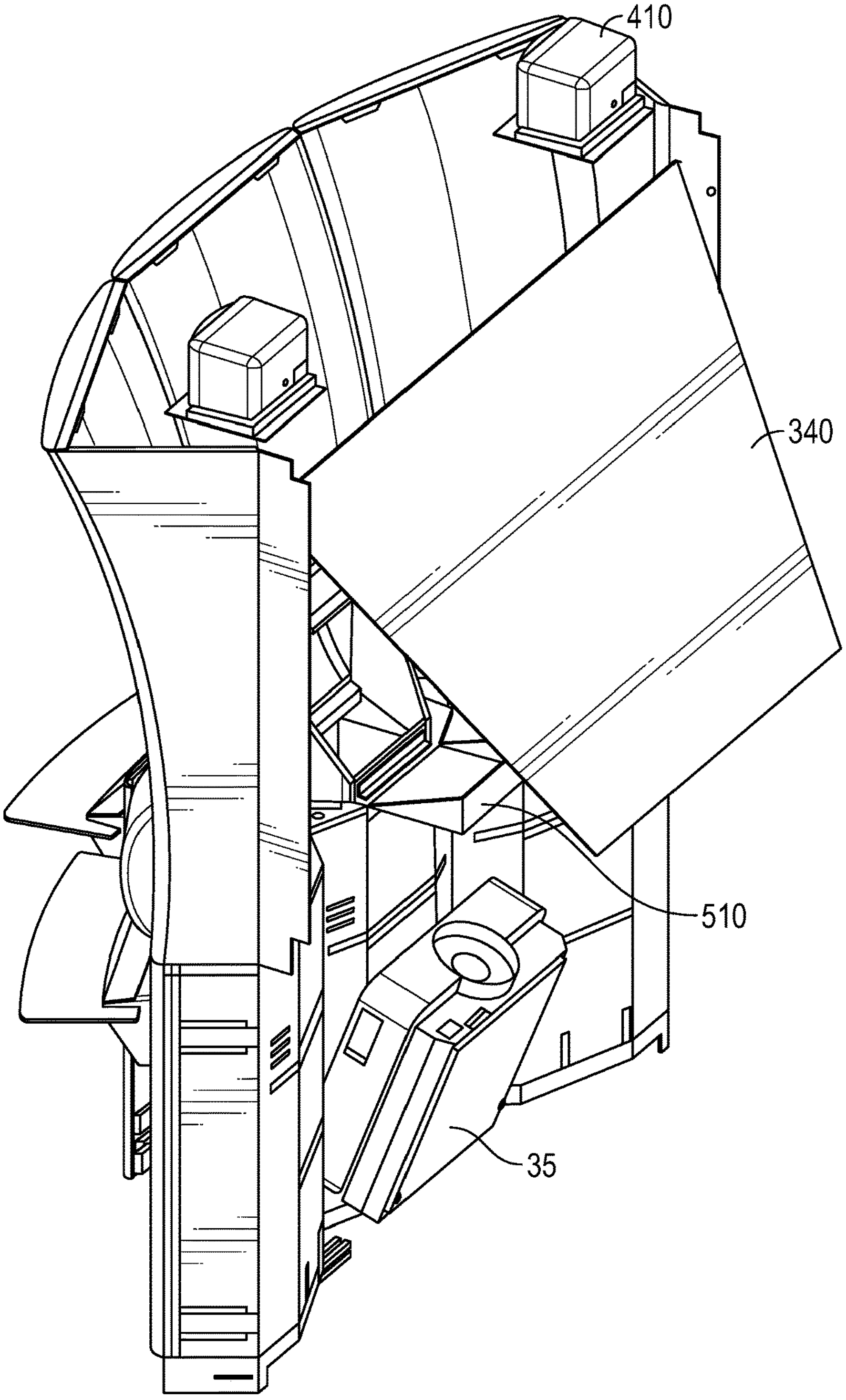
FIG. 5 is a perspective view of a gaming system, from the rear, in accordance with an embodiment of the present disclosure.

FIG. 4 provides a partial view of a bank of three gaming machines in accordance with one embodiment. In this example, it is further illustrated that a gaming machine may have an access door 405, which provides access to the components of the gaming machine, including the primary projection display 30. In this embodiment, it is contemplated that providing access from the front of the machine will provide benefits in the area of maintenance and usability. For example, gaming machines are often positioned on a casino floor so that the rear is not easily viewable by players, for example against a wall or another bank of gaming machines. In such an example, it is desirable to provide frontal access to secure components of gaming machines, as provided for in FIG. 4. In another embodiment, one gaming machine in a bank of gaming machines, for example the middle one as illustrated, is configured with an access door 405 that slides out additional length to allow access to secondary projection display 35 (as shown in FIG. 5). In one example of such an embodiment, access door 405 may have a secure enclosure to provide additional security to sensitive gaming components from the rear, but also allows access to secondary projection display 35 when pulled out far enough.

FIG. 4 further illustrates community speakers 410. In one embodiment, the structure to support community speakers 410 forms part of the structure to support secondary reflector 340. In another embodiment, community speakers are controlled by a community display server, which may also be in communication with the community GPU. In a further embodiment, such a community display server may be configured to provide or assist in providing casino-funded bonus events, such as player loyalty events. In another example, such a community display server may be configured to provide or assist in providing casino messaging, marketing, advertisements, or other non-game-specific information.

FIG. 5 provides a partial view of the rear view of a bank of three gaming machines, in accordance with one embodiment. FIG. 5 further illustrates an embodiment where a single secondary projection display 35 is provided to project images on multiple gaming machines. In this embodiment, it is contemplated that each gaming machine will have a dedicated primary projection display, but a single secondary projection display 35 for the bank of gaming machines. It is further contemplated that such an arrangement provides additional benefits regarding the footprint of the bank of machines, as well as hardware costs for providing the bank of gaming machines. FIG. 5 also illustrates a joint part 510, which facilitates the proper alignment of adjacent gaming machines.

In another embodiment, secondary projection display 35 is positioned to project directly onto secondary screens 360. In such an embodiment, secondary projection display 35 may be positioned on a support structure behind the secondary display screen 360 and positioned to projected directly onto one or more secondary screens 360.

Figure 6:
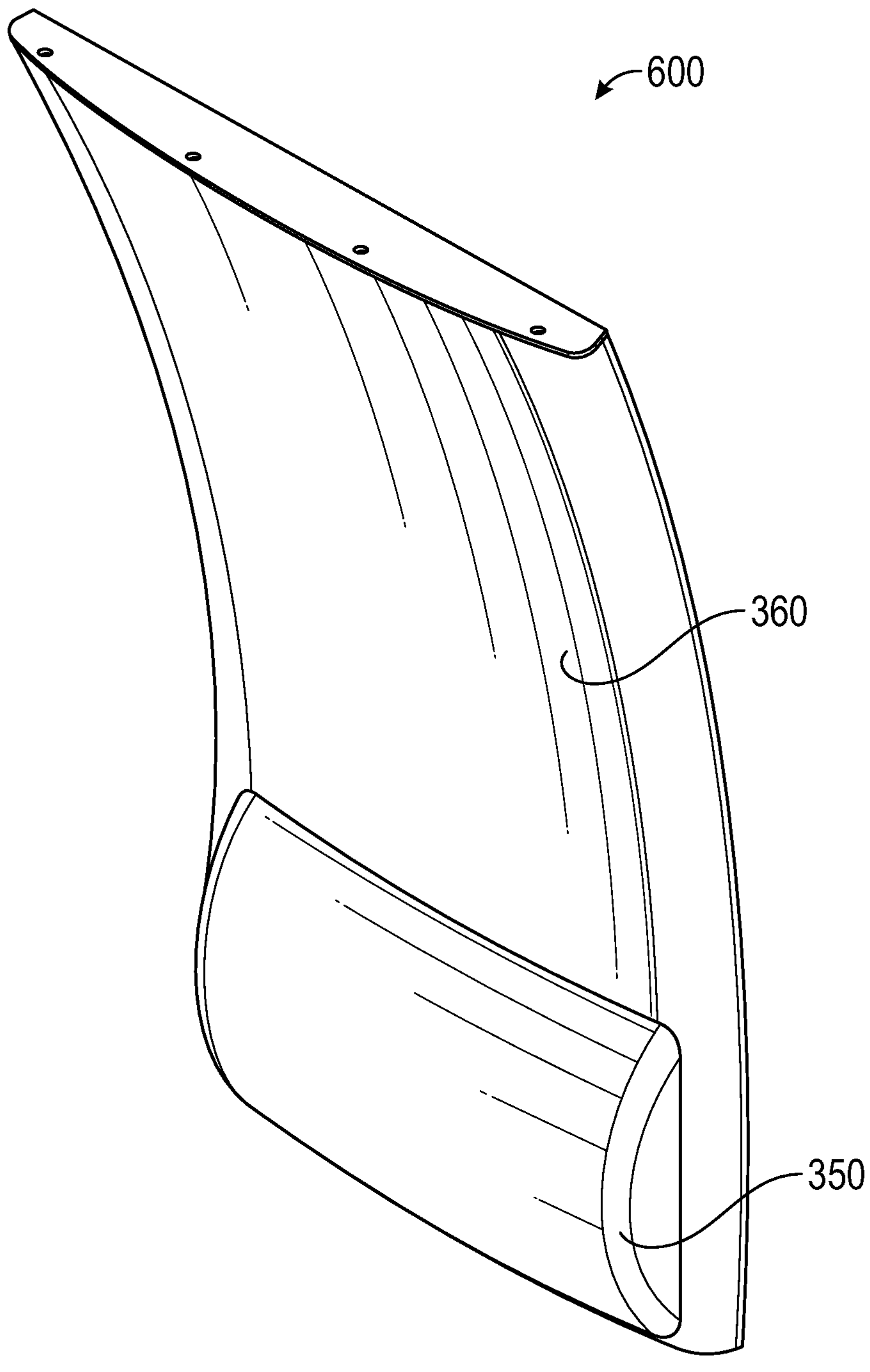
FIG. 6 is a perspective view of a display component of a gaming machine, in accordance with an embodiment of the present disclosure.

FIG. 6 provides a close-up view of the game screen, shown generally at 600. In this embodiment, display screen 600 is comprised of two visually distinct sections, primary game screen 350 and secondary screen 360. Primary game screen 350 is formed in a semi-circle to resemble the curvature of slot machine reels. In this embodiment, the images projected onto the rear of the primary game screen may resemble traditional reels which are familiar to casino players, and the curvature of the primary game screen 350 further aids in having the projected image resemble traditional reels. Secondary screen 360 is formed in a semi-circle manner, with the radius towards the front of the gaming machine. In this example, the curvature allows for projected images to be displayed in close proximity to a player at the front of the display screen 600. In one embodiment, primary game screen 350 has a first curvature and secondary screen 360 has a second, different curvature, the secondary screen being located above the primary game screen. In another embodiment, primary game screen 350 has a curvature with a radius extending substantially away from the front of the machine and away from the player, and secondary screen 360 has a curvature with a radius extending substantially towards the front of the machine and towards a player, each as illustrated in FIG. 4. In another embodiment, primary game screen 350 and/or secondary screen 360 is comprised of a compound curvature/radius. In a further embodiment, primary game screen 350 and/or secondary screen 360 does not include any curvature. In still a further embodiment, primary game screen 350 and/or secondary screen 360 includes both a curvature portion and a non-curved portion.

In another embodiment one of or both of the primary game screen and/or secondary screen has an associated touch-sensitive display, which can act as an input device. In a further embodiment, at least part of display screen 600 has a coating and or film on the front or rear of the screen, which assists in light diffusion, color transmission, and/or color/black tinting. In another embodiment, display screen is formed from a single piece of rigid yet light-transmissive material, such as thermoplastic, acrylic, or glass. In another embodiment, display screen 600 comprises small ridges which are configured to assist with the viewing of the projected display. In still another embodiment, display screen 600 may be formed from such commercially available rear projection screen products as offered by Nitto Jushi Kogyo Co., Ltd.

Reference to software in the present disclosure may encompass one or more computer programs that may encompass data, instructions, or both.

One or more tangible and non-transitory computer-readable media may store or otherwise embody software implementing particular embodiments. A tangible computer-readable medium may be any tangible medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. Example tangible, non-transitory computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate.

Further examples are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure.

What is claimed is:

1. A gaming system comprising:
- a plurality of gaming machines, each gaming machine comprising:
  - a primary game screen having a first curvature;
  - a secondary screen having a second, different curvature, the secondary screen being located above the primary game screen; and
  - a primary projection display positioned to project a first video at least partially away from the primary game screen, wherein the projected first video reflects off of at least one primary reflector onto the primary game screen;
- a secondary projection display positioned to simultaneously project a second video image onto each of the secondary screens of the plurality of gaming machines.

2. The gaming system of claim 1, wherein the secondary projection display is positioned to project the second video image at least partially away from the secondary screen of at least one of the plurality of gaming machines, and the projected second video image reflects off of at least one secondary reflector onto at least one of the secondary screens.

3. The gaming system of claim 1, wherein the secondary projection display is in electronic communication with one of the plurality of gaming machines.

4. The gaming system of claim 1, wherein the secondary projection display is in electronic communication with each of the plurality of gaming machines.

5. The gaming system of claim 1, wherein the first curvature has a radius which extends substantially away from a player of the gaming machine.

6. The gaming system of claim 1, wherein the second curvature has a radius which extends substantially towards a player of the gaming machine.

7. The gaming system of claim 1, wherein the primary game screen and the secondary screen are comprised of a single piece of material.

8. The gaming system of claim 1, wherein at least one of the primary game screen and the secondary screen comprises small ridges.

9. A gaming system comprising:
- a plurality of gaming machines, each gaming machine comprising:
  - at least one display device;
  - at least one secondary screen;
  - at least one processing unit;
  - at least one memory device that stores a plurality of instructions that, when executed by the at least one processing unit, cause the gaming machine to display a game, based on a wager placed by a player, on the at least one display device;
- a secondary projection display positioned to simultaneously project a second video image onto each of the secondary screens of the plurality of gaming machines.

10. The gaming system of claim 9, wherein the secondary projection display is in communication with a community processing unit.

11. The gaming system of claim 10, wherein the community processing unit is in communication with the at least one processing unit of one of the plurality of gaming machines.

12. The gaming system of claim 10, wherein the community processing unit is in communication with the at least one processing unit of each of the plurality of gaming machines.

13. The gaming system of claim 9, wherein the at least one processing unit of one of the plurality of gaming machines causes, based on the plurality of instructions, the secondary projection display to project an image onto each of the secondary screens.

14. The gaming system of claim 9, wherein the secondary projection display projects images based on a game event that occurs on one of the gaming machines.

15. The gaming system of claim 14, wherein the projected images based on the game event are only projected onto the secondary screen of the gaming machine where the game event occurred.

16. The gaming system of claim 9, wherein the at least one display device comprises a primary projection display.

17. The gaming system of claim 9, wherein the at least one display device comprises a primary game screen having a first curvature.

18. The gaming system of claim 9, wherein the at least one secondary screen comprises a second curvature.

19. The gaming system of claim 9, wherein the secondary projection display is positioned to project the second video image at least partially away from the secondary screen of at least one of the plurality of gaming machines, and the projected second video image reflects off of at least one secondary reflector onto at least one of the secondary screens.

20. The gaming system of claim 9, wherein the at least one secondary screen comprises a curvature having a radius which extends substantially towards the player of the gaming machine.

* * * * *